(12) United States Patent
Gyllenhammar et al.

(10) Patent No.: US 12,319,320 B2
(45) Date of Patent: Jun. 3, 2025

(54) RISK ESTIMATION IN AUTONOMOUS DRIVING ENVIRONMENTS

(71) Applicant: ZENUITY AB, Gothenburg (SE)

(72) Inventors: Magnus Gyllenhammar, Pixbo (SE); Håkan Sivencrona, Jörlanda (SE)

(73) Assignee: ZENUITY AB, Gothenburg (SE)

(*) Notice: Subject to any disclaimer, the term of this patent is extended or adjusted under 35 U.S.C. 154(b) by 259 days.

(21) Appl. No.: 17/477,920

(22) Filed: Sep. 17, 2021

(65) Prior Publication Data

US 2022/0089192 A1 Mar. 24, 2022

(30) Foreign Application Priority Data

Sep. 18, 2020 (EP) .................................. 20196794

(51) Int. Cl.
- *B60W 60/00* (2020.01)
- *B60W 30/095* (2012.01)
- *B60W 40/04* (2006.01)
- *B60W 50/14* (2020.01)

(52) U.S. Cl.
CPC .... *B60W 60/0059* (2020.02); *B60W 30/0956* (2013.01); *B60W 40/04* (2013.01); *B60W 50/14* (2013.01); *B60W 60/0015* (2020.02); *B60W 60/0053* (2020.02); *B60W 2050/146* (2013.01);

(Continued)

(58) Field of Classification Search
None
See application file for complete search history.

(56) References Cited

U.S. PATENT DOCUMENTS

| 10,872,379 B1* | 12/2020 | Nepomuceno ....... G08G 1/0129 |
| 2015/0203113 A1 | 7/2015 | Duncan et al. |
| 2016/0086285 A1 | 3/2016 | Jordan Peters et al. |

(Continued)

FOREIGN PATENT DOCUMENTS

EP 3631366 A1 4/2020

OTHER PUBLICATIONS

Office Action mailed Mar. 28, 2023 for European Patent Application No. 20196794.0, 6 pages.

(Continued)

*Primary Examiner* — Christian Chace
*Assistant Examiner* — Shayne M. Gilbertson
(74) *Attorney, Agent, or Firm* — Sage Patent Group (57) ABSTRACT

A control system and a method for estimating a risk exposure of an automated driving system (ADS) of a vehicle. Obtaining an actuation capability of the vehicle, wherein the obtained actuation capability includes an uncertainty estimation for the actuation capability. Obtaining a location of free-space areas in the surrounding environment of the vehicle, wherein the obtained location of free-space areas comprises an uncertainty estimation for the estimated location of free-space areas. Forming a risk map of the surrounding environment of the vehicle based on the obtained actuation capability and the obtained location of free-space areas, wherein the risk map includes a risk parameter for each of a plurality of area segments included in the surrounding environment of the vehicle. Determining a total risk value of the ADS based on the risk parameters of a set of area segments intersected by at least one planned path of the ADS.

14 Claims, 7 Drawing Sheets

(52) U.S. Cl.
CPC . *B60W 2554/4041* (2020.02); *B60W 2556/40* (2020.02)

(56) References Cited

U.S. PATENT DOCUMENTS

| | | | |
|---|---|---|---|
| 2017/0089710 A1 | 3/2017 | Slusar | |
| 2018/0075309 A1* | 3/2018 | Heck | G06V 20/58 |
| 2019/0135278 A1* | 5/2019 | Hillman | B60W 30/09 |
| 2019/0333386 A1* | 10/2019 | Horita | G08G 1/166 |
| 2019/0389460 A1* | 12/2019 | Tokunaga | B60K 35/28 |
| 2020/0307617 A1* | 10/2020 | Sakai | B60R 1/24 |
| 2022/0348196 A1* | 11/2022 | Foltin | B60W 50/0097 |

OTHER PUBLICATIONS

Extended European Search Report mailed Feb. 25, 2021 for European Patent Application No. 20196794.0, 9 pages.
Puphal, Tim et al.; "Probabilistic Uncertainty-Aware Risk Spot Detector for Naturalistic Driving", IEEE Transactions on Intelligent Vehicles, vol. 4, No. 3, Sep. 2019, pp. 406-415 (10 pages).
Communication pursuant to Article 94(3) EPC mailed Sep. 12, 2024 for European Patent Application No. 20196794.0, 6 pages.

* cited by examiner

RISK ESTIMATION IN AUTONOMOUS DRIVING ENVIRONMENTS

CROSS-REFERENCE TO RELATED APPLICATIONS

The present application for patent claims priority to European Patent Office Application Ser. No. 20196794.0, entitled "RISK ESTIMATION IN AUTONOMOUS DRIVING ENVIRONMENTS" filed on Sep. 18, 2020, assigned to the assignee hereof, and expressly incorporated herein by reference.

TECHNICAL FIELD OF THE INVENTION

The present invention relates to automated driving systems, and in particular to risk estimation for vehicles equipped with an automated driving system.

BACKGROUND

During these last few years, the development of autonomous vehicles has exploded and many different solutions are being explored. An increasing number of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. Today, development is ongoing in both ADAS as well as Autonomous Driving (AD), within a number of different technical areas within these fields. ADAS and AD will herein be referred to under the common term Automated Driving System (ADS) corresponding to all of the different levels of automation as for example defined by the SAE J3016 levels (0-5) of driving automation.

Accordingly, in a not too distant future, ADS solutions will to a greater extent find their way into modern vehicles. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles and/or relevant signage.

ADS features as described above are, however, bound to be required to function with a high integrity to provide sufficiently low risk for the vehicle occupant(s) as well as their surrounding environments. Ensuring that the risk is sufficiently low may require intractable amounts of data for statistical proofs, and would, according to an example, take e.g. approximately a hundred vehicles to drive continuously for five centuries, to acquire. There are several approaches to minimize the risk of the ADS features before they are launched onto public roads. However, on top of this, it is generally believed that the ADS features should be monitored once in the field, in order to ensure that they adhere to required safety levels.

Assuring the safety of automated driving systems (ADS) is one of the central challenges in being able to release such systems to the market. Safety can be viewed as the absence of risk and this is also one of the most tractable ways of viewing it. It will be impossible to prove that there will be zero accidents (i.e. 100% safe), but it can be proven that the risk of an accident is less than, let's say, 10-6 (i.e. likelihood of an accident is less than once in 106 hours of driving) with a certain confidence in these estimates. Although, to get to such numbers there is a need for a huge amount of data from a large number of driven kilometers. The risk for crashes can then be inferred using this data.

One of the pitfalls here is however that it is difficult to get nuances in the data. Either there was an incident or it wasn't, at least if this is the only thing that is logged. With more detailed data it is however possible to get more refined measurements of the performance. One example of this is calculating the brake threat number (BTN) across all collected data. In such a way it might be possible to infer the risk of a crash (or too high BTN) using a smaller amount of data. One of the drawbacks of using such parameters is however that it is really difficult to make them all-encompassing. The BTN for example does not account for lateral maneuvers from the own vehicle (ego-vehicle) to avoid a possible crash. Thus, even though it would have been impossible to brake it might still have been easy to avoid a crash. Conversely, the BTN does not handle situations that might be critical if it includes lateral displacements. With more refined data one can get a better understanding of the real risk that the ADS is exposed to while operational but it is difficult to ensure that this includes the entirety of the challenge for the ADS.

Accordingly, there is a need in the art for new and improved solutions, or even a new framework, for quantifying the risk that an ADS is exposed to and has been exposed to during a drive. In particular there is a need for computationally efficient and reliable solutions providing nuanced data that may facilitate further development of various ADS functions or features.

SUMMARY OF THE INVENTION

It is therefore an object of the present invention to provide a method and control system that alleviate all or at least some of the above-discussed drawbacks of presently known systems and methods.

Further, it is an object of the present invention to provide a method and control system that provide a new framework, for quantifying the risk that an ADS is exposed to and has been exposed to during a drive. In particular, it is an object to provide a method and control system that are computationally efficient and reliable solutions providing nuanced data that may facilitate further development of various ADS functions or features.

These objects are achieved by means of a method for estimating a risk exposure of an ADS of a vehicle, a computer-readable storage medium, a control system, and a vehicle comprising a control system as defined in the appended claims. The term exemplary is in the present context to be understood as serving as an instance, example or illustration.

According to a first aspect of the present invention, there is provided a method for estimating a risk exposure of an automated driving system (ADS) of a vehicle. The method comprises obtaining an actuation capability of the vehicle, wherein the obtained actuation capability includes an uncertainty estimation for the actuation capability. The method further comprises obtaining a location of free-space areas in the surrounding environment of the vehicle, wherein the obtained location of free-space areas comprises an uncertainty estimation for the estimated location of free-space areas. Furthermore, the method comprise forming a risk map of the surrounding environment of the vehicle based on the obtained actuation capability and the obtained location of free-space areas, wherein the risk map comprises a risk parameter for each of a plurality of area segments comprised in the surrounding environment of the vehicle.

The method further comprises determining a total risk value of the ADS based on the risk parameters of a set of area segments intersected by at least one planned path of the ADS.

According to a second aspect of the present invention, there is provided a (non-transitory) computer-readable storage medium storing one or more programs configured to be executed by one or more processors of an in-vehicle processing system, the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a third aspect of the present invention, there is provided a control system for estimating a risk exposure of an automated driving system (ADS) of a vehicle. The control system comprises control circuitry configured to obtain an actuation capability of the vehicle, wherein the obtained actuation capability includes an uncertainty estimation for the actuation capability. The control circuitry is further configured to obtain a location of free-space areas in the surrounding environment of the vehicle, wherein the obtained location of free-space areas comprises an uncertainty estimation for the estimated location of free-space areas. Furthermore, the control circuitry is configured to form a risk map of the surrounding environment of the vehicle based on the obtained actuation capability and the obtained location of free-space areas, wherein the risk map comprises a risk parameter for each of a plurality of area segments comprised in the surrounding environment of the vehicle. The control circuitry is further configured to determine a total risk value of the ADS based on the risk parameters of a set of area segments intersected by at least one planned path of the ADS. With this aspect of the invention, similar advantages and preferred features are present as in the previously discussed first aspect of the invention.

According to a fourth aspect of the present invention, there is provided a vehicle comprising an automated driving system (ADS), a perception system comprising at least one sensor configured to monitor a surrounding environment of the vehicle, a vehicle control system comprising at least one sensor configured to monitor an actuation capability of the vehicle, a localization system configured to monitor a geographical map position of the vehicle, and a control system according to any one of the embodiments disclosed herein. With this aspect of the invention, similar advantages and preferred features are present as in the previously discussed first aspect of the invention.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF FIGURES

Further objects, features and advantages of embodiments of the invention will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

In the present context, a risk map estimates and quantifies a view of the "risk" across the ADS's surrounding (i.e. of the ego-vehicle's surroundings), and preferably includes sensor capabilities, uncertainties in detections and predictions as well as uncertainties in the available capabilities of the vehicle platform.

The present invention proposes a means to evaluate the planned path of the vehicle, i.e. the path that the ADS has decide to drive according to, on a risk map in each time instance during a drive. Thereby one may get a consolidated measure of the risk that the ADS exposes itself to, across an entire drive or driving session. The measure of the risk is accordingly based on the currently planned path for execution as well as previously executed paths of the ADS. In more detail, in contrast to previously known solutions, the risk estimate obtained in accordance with the invention is not dependent on any intermediary threat measure or similar (such as e.g. Brake Threat Number). Instead it may be understood as a direct estimate of the risk based on a number of models underpinning the worldview of the ADS (i.e. the perceived reality of the ADS using sensor data, map data, etc.), as well as its estimate of its own capabilities. Further, this approach provides a continuous measure between no risk and crash as opposed to other existing methods to evaluate the performance of automated/autonomous vehicles. The estimate of the total risk, as presented herein, results in a fine-grained measure of the risk of the ADS has been exposed to. Rather than just being able to add the number of hours without an incident, it is possible to compare individual hours driven. An advantage of this approach is that new ADS software could be tested and compared towards a previous version more reliably and with fewer kilometres or smaller (test) fleets. In other words, updated versions of the ADS software may be released at a faster pace and at lower cost due to an improved validation process.

Figure 1:
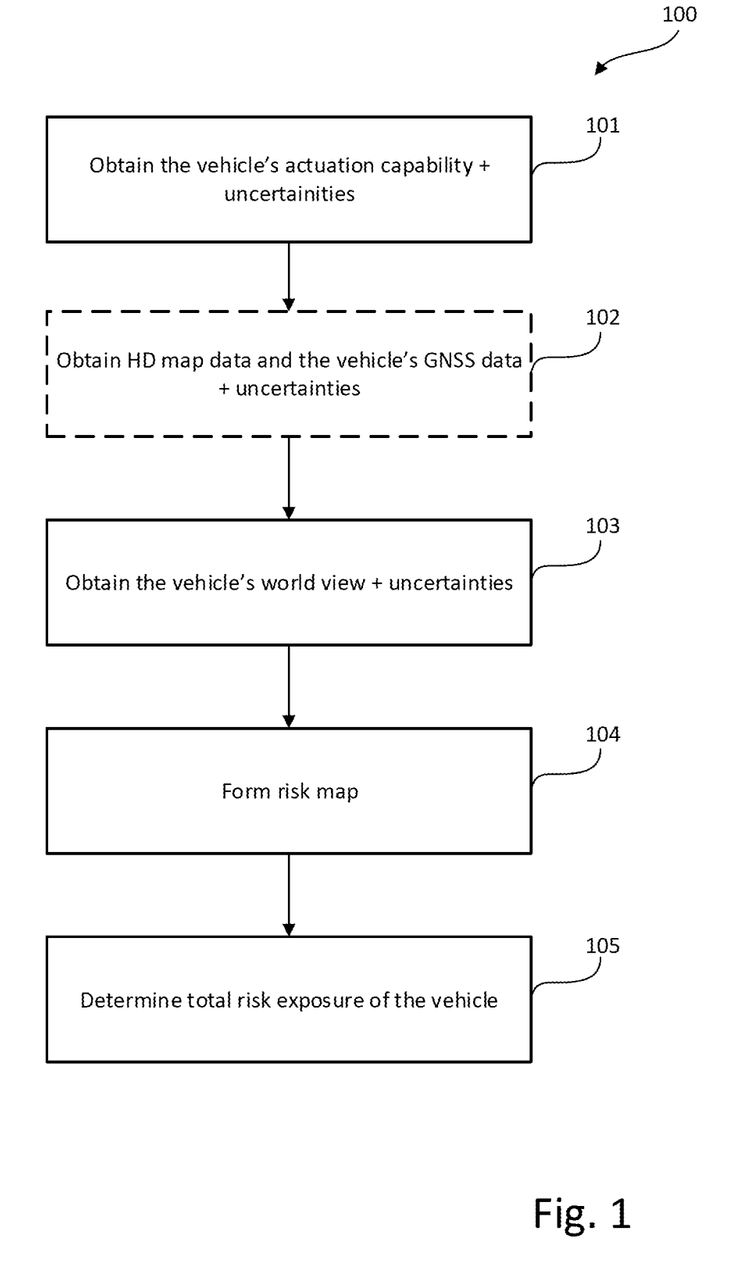
FIG. 1 is a schematic flow chart representation of a method for estimating a risk exposure of an automated driving system (ADS) of a vehicle in accordance with an embodiment of the present invention.

FIG. 1 illustrates a schematic flow chart representation of a method 100 for estimating a risk exposure of an automated driving system (ADS) of a vehicle in accordance with an embodiment of the present invention. The method 100 comprises obtaining 101 an actuation capability of the vehicle, where the obtained actuation capability includes an uncertainty estimation for the actuation capability. The actuation capability may be derived from sensor data may for example be obtained from vehicle-mounted sensors, internal control units, or the like. The term obtaining is herein to be interpreted broadly and encompasses receiving, retrieving, collecting, acquiring, and so forth.

The actuation capability of the vehicle may for example include one or more actuation parameters such as e.g. braking capacity, maximum steering angle, maximum acceleration capability, etc. including an uncertainty estimate for each parameter. The actuation capability and the associated uncertainty estimate(s) may be determined in real-time based on a predefined model given one or more real-time variables such as e.g. current speed, vehicle properties (vehicle dimensions, vehicle weight, etc.), road surface properties, and so forth, as readily understood by the skilled person in the art. The uncertainty estimates may be derived from predefined statistical models associated with each actuation parameters, where the actuation capability is given by the mean or mode value and the uncertainty estimate is given by e.g. one or two standard deviations above or below the mean.

Further, the method 100 comprises obtaining 103 a location of free-space areas in the surrounding environment of the vehicle, where the obtained location of free-space areas comprises an uncertainty estimation for the estimated location of free-space areas. The free-space areas may for example be derived from sensor data of one or more vehicle-mounted sensors configured to monitor the surrounding environment of the vehicle. Nevertheless, the sensor data may also originate from other sensors in the vicinity of the vehicle, e.g. sensors mounted on other vehicles or on infrastructure elements and obtained via a V2V or V2X communication network.

Free-space areas may in the present context be understood as areas in the surrounding environment of the ego-vehicle absent of objects (e.g. other vehicles, pedestrians, barriers, animals, bicycles, static objects, etc.). Thus, the obtained 103 location of free-space areas may be understood as estimates of areas absent of external objects (static and dynamic objects) as well as an estimate of the uncertainty of this determination, i.e. the likelihood of the determined location of the free-space area actually being true.

Moreover, in some embodiments, the location of free-space areas comprises a position of external objects located in the surrounding environment of the ego-vehicle. The estimated position of the external objects may include uncertainties of the position of the external objects, estimated trajectories of any dynamic objects of the external objects and uncertainties of the estimated trajectories of the dynamic objects. However, in some embodiments the location of free-space areas is determined by a dedicated module of the vehicle, where the dedicated module is configured to obtain sensor data indicative of the surrounding environment of the vehicle, and to derive the location of the free-space areas with respect to the vehicle based on the sensor data. Thus, there does not have to be an intermediate step or layer where objects are detected before the location of the free-space areas is obtained, i.e. the "free-space area" may be obtained directly. For example, a signal emitted by a Lidar may propagate through space for a certain distance before it is reflected from some surface, then this area between the Lidar and the surface may be defined as a "free-space area" without any operation or step to define the surface that the signal was reflected from.

Still further, the method 100 comprises forming 104 a risk map of the surrounding environment of the ego-vehicle based on the obtained 101 actuation capability and the obtained 103 location of free-space areas. The risk map comprises a risk parameter for each of a plurality of area segments comprised in the surrounding environment of the ego-vehicle. Thus, one can utilize the ADS's readily available functionality of estimating the "free space" in the surrounding area of the ego-vehicle and the functionality of estimating the operating capabilities of the vehicle platform (both of which are generally used for making decisions and controlling the vehicle), and then use this functionality in order to generate a risk map.

Examples of a risk map are depicted in FIGS. 3-6, where the risk map is formed based on the worldview of the ADS including the uncertainties of the detections and predictions from the perception system, the localisation within the map, as well as the capabilities and the uncertainties of the capabilities of the vehicle platform.

Each risk parameter may for example be indicative of a probability of an accident event or of a probability of violating any predefined safety margin or threshold if the vehicle were to occupy an associated area segment, or more specifically for a planned path of the vehicle to intersect that area segment. In a simplified example, if a first area segment is completely within an area occupied by an external vehicle, then that first area segment may have a risk parameter indicating that the first area segment is a "high risk" segment. This is at least partly based on the logical reasoning that if the vehicle's planned path were to intersect that segment, one can assume that there is a relatively high probability of collision with the external vehicle. Analogously, if a second area segment is completely within a drivable road segment void of any external objects, then that second area segment may have a risk parameter indicating that the second area segment is a "low risk" segment.

The term "probability of violating a predefined safety margin or threshold" may for example be an estimate of a probability of violating a predefined minimum distance to other vehicles. In more detail, one can assume that the probability of violating such a safety threshold increases when the planned path of the vehicle involves a take-over maneuverer, or maneuvering through dense traffic as compared to driving on an empty highway. Thus, given some statistical model indicative of certain scenarios occurring in the operational design domain (ODD) of the vehicle, one can estimate the probability of an external vehicle performing an unexpected maneuver which would cause a violation of the predefined minimum distance to a lead vehicle, and also estimate the probabilities of this specific action taking place on various scenarios. As mentioned, one can assume that there is a higher risk of being exposed to such "unexpected maneuvers" in dense city traffic than on empty highways. In other words, the risk parameters does not necessarily have to indicate a probability of an accident event, but may be defined on other metrics such as exemplified above. Other examples include other quality metrics such as distance to road edge, magnitude of jerk (e.g. lateral acceleration), and so forth.

The method 100 further comprises determining 105 a total risk value of the ADS, or a total risk value that the ADS is/has been exposed to, based on the risk parameters of a set of area segments intersected by at least one planned path of the ADS. The planned path is in the present context to be understood as a "planned and selected" path, i.e. a path that has been selected for execution. Thus, a planned path may be an executed path, or a path about to be executed. Thus, the total risk is determined 102 based on a set of planned paths that the ADS has planned and selected for execution. Accordingly, the method 100 may further comprise obtaining the planned path of the ADS.

More specifically, for each time instance/sample the total risk of the ADS is estimated/determined by for example adding together the risk parameters of the sections (area segments) that the planned paths intersects and combining this with the total risk value derived in a preceding time instance. The term "combining" is herein to be interpreted broadly and may cover a number of mathematical operations in order to "correctly" combine the values as will be exemplified. Moreover, the total risk value may further be determined based on a time duration of the at least one planned path. Thereby one can estimate a risk exposure of the ADS per time unit.

Figure 6:
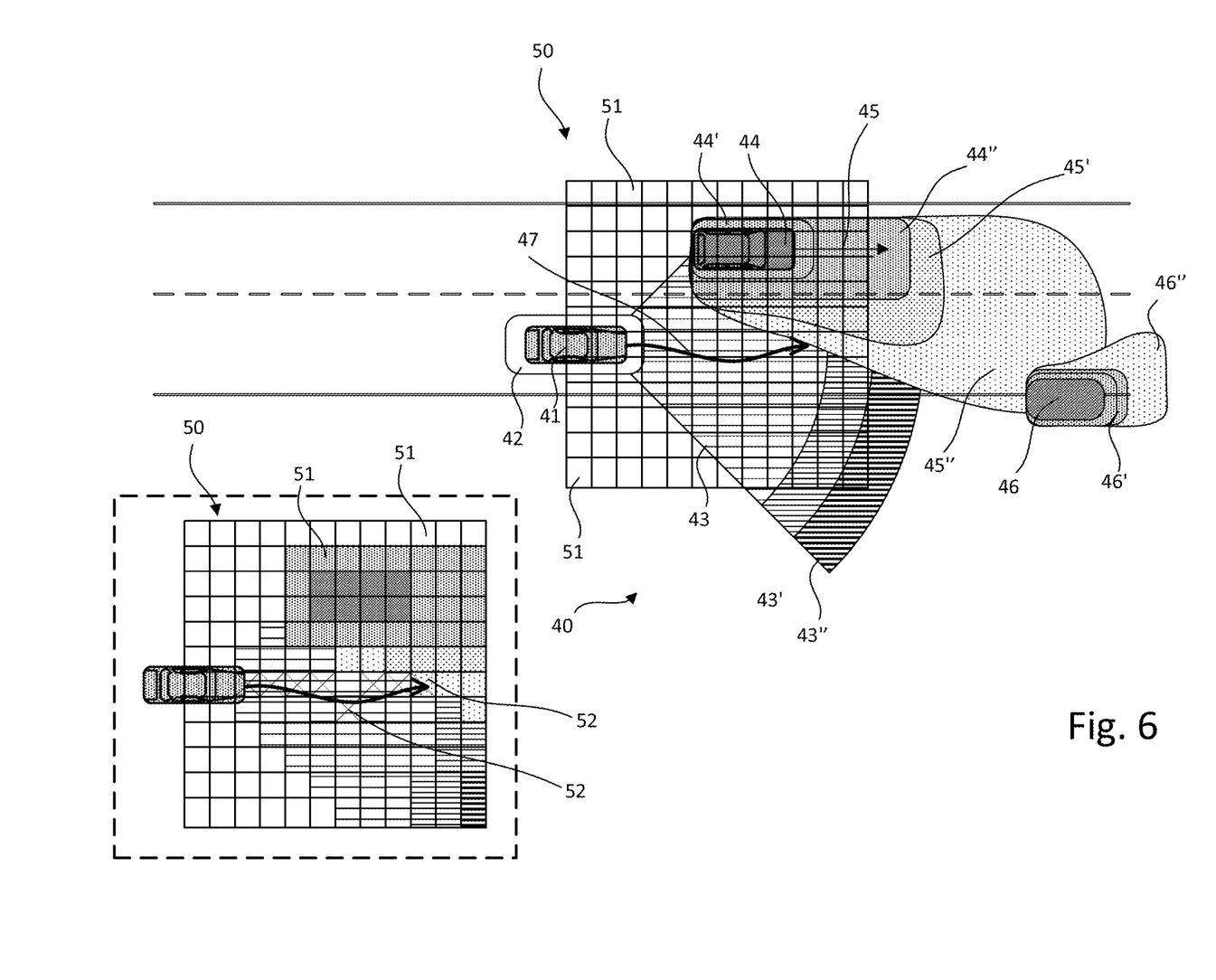
FIG. 6 is a schematic top view illustration of a risk map from FIG. 5 with area segments indicated in the form of a grid in accordance with an embodiment of the present invention.

The determination 105 of the risk value may for example be simplified through the use of a grid framework, as depicted in FIG. 6. Thus, in some embodiments, the step of determining 105 the total risk value comprises aggregating the risk parameters of the set of area segments intersected by each planned path of the at least one planned path. Thus, the total risk value depends on the current yet-to-be-executed path and the previously planned and executed paths. The total risk value is determined based on the aggregated risk parameters and a total number of samples used to generate the aggregated risk parameters. Further details regarding the computation of the total risk are provided below, in reference to FIG. 2.

In some embodiments, the method 100 further comprises obtaining 102 map data comprising HD map information of the surrounding environment and a geographical position of the vehicle, where the estimated geographical position includes an uncertainty estimation of the estimated geographical position of the vehicle. Accordingly, the risk map is formed further based on the obtained map data.

Further, in some embodiments, the ADS associated with a statistical model indicative of a statistical distribution related to a plurality of scenarios in the surrounding environment of the ego-vehicle. Accordingly, the method 100 may further comprise obtaining a probability of at least one scenario occurring in the surrounding environment of the vehicle, such that the risk map is further formed based on the obtained probability of the at least one scenario occurring in the surrounding environment of the vehicle. Further details related to the statistical modelling of scenarios in the surrounding environment of the vehicle is available in the European Patent Application No. EP20169897.4 by the same Applicant, Zenuity AB from Gothenburg, Sweden, incorporated herein by reference, and will for the sake of brevity and conciseness not be further elaborated upon.

Executable instructions for performing these functions are, optionally, included in a non-transitory computer-readable storage medium or other computer program product configured for execution by one or more processors.

Figure 2:
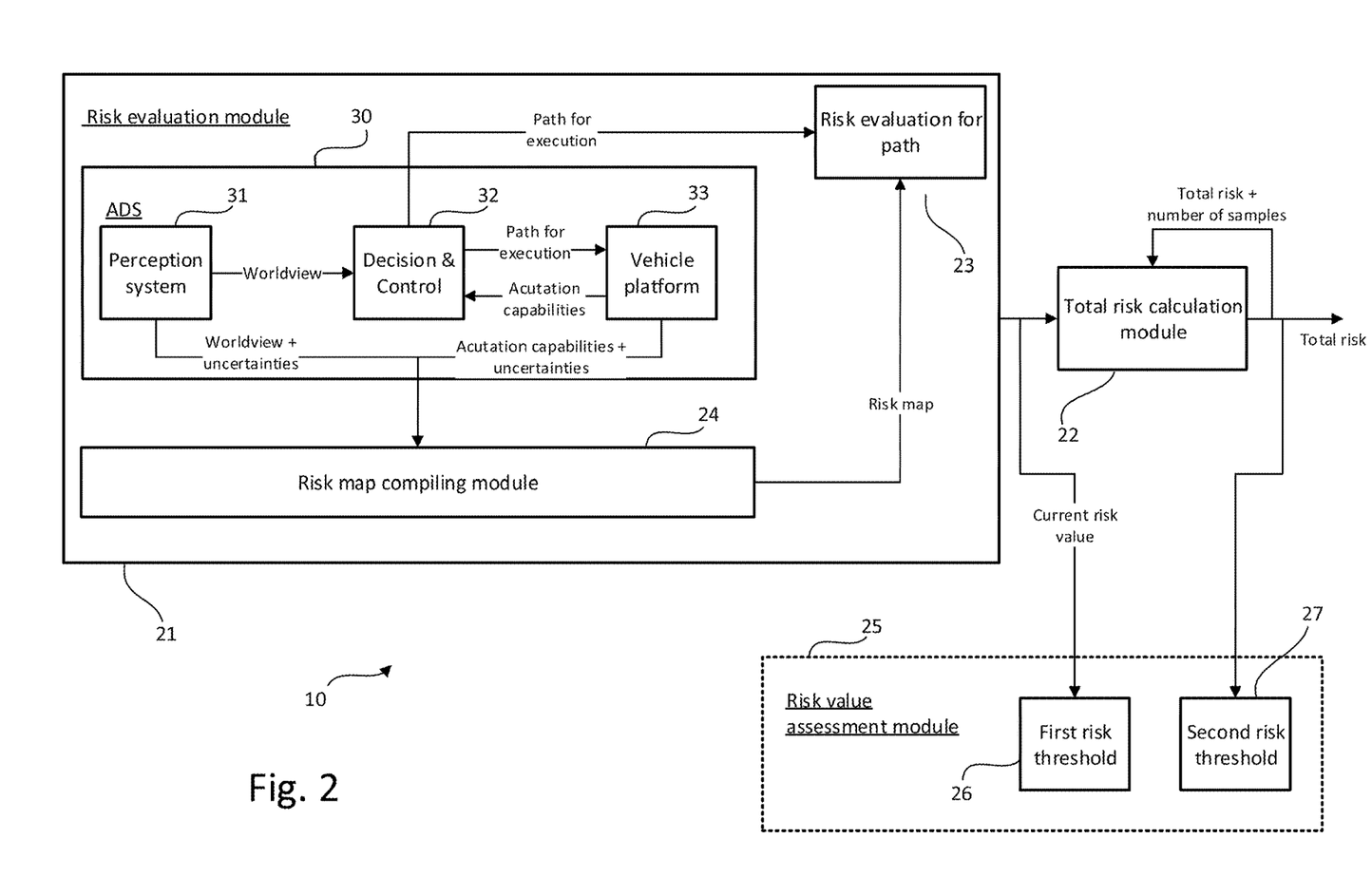
FIG. 2 is a schematic block diagram representation of a control system for estimating a risk exposure of an ADS of a vehicle in accordance with an embodiment of the present invention.

FIG. 2 is a schematic block diagram representation of a control system 10 for estimating a risk exposure of an automated driving system (ADS) of a vehicle in accordance with an embodiment of the present invention. The control system 10 comprises control circuitry that may be realized as a software controlled processor. However, the control circuitry may alternatively be realized wholly or partly in hardware. In the depicted embodiment of FIG. 2, the control circuitry comprises a set of modules, however, these are not necessarily to be construed as limiting to the present invention, but serve to further elucidate the present invention. As readily understood by the skilled artisan there are several ways to practically realize the inventive concepts disclosed herein, for example by other types of software/hardware architectures than the example embodiment illustrated in FIG. 2 without departing from the scope of the present invention. Such variations may depend on intended applications or system specifications.

Moving on, the control system 10 comprises a risk evaluation module 21, which is configured to compile the risk map and to evaluate the risk of a path that has been provided/selected for execution. In more detail, the risk map is built up of the worldview of the ADS 30 including the uncertainties of the detections and predictions from the perception system 31 (i.e. the estimated location of free-space areas), the localization within the map as well as the uncertainties of the capabilities of the vehicle platform 33. The ADS 30 is herein depicted as a module comprising a sub-module for decision and control 32, where information from the perception system 31 and vehicle platform 33 is used to generate paths for execution by the vehicle platform 33. The risk associated with that path is subsequently calculated/quantified by another module 23 based on the compiled risk map.

Accordingly, a risk map compiler 24 obtains an actuation capability of the vehicle e.g. from a sub-system associated with the vehicle platform 33. Moreover, the obtained actuation capability further includes an uncertainty estimation for the actuation capability. The actuation capability may be estimated by the control circuitry based on raw sensor data provided from the sub-system of the vehicle platform 33, or it may be directly obtained as processed sensor data (i.e. the raw sensor data may be pre-processed and then sent to the risk map compiling module 24).

In an illustrative example, the obtained actuation capability may comprise a braking capacity and an uncertainty estimation or a type of "error margin" of the obtained braking capacity. For example, if the obtained braking capacity is indicative of the vehicle being able to come to a complete stop (assuming emergency braking actuation) within a distance of 150 meters, then an uncertainty estimation may include an error margin of ±15 meters (i.e. ±10%). As mentioned in the foregoing, the actuation capability may be given from statistical models of one or more actuation parameters where the uncertainty estimation for each actuation parameter may be defined by the standard deviation in those statistical models.

Further, the risk map compiler 24 obtains a location of free-space areas in the surrounding environment of the vehicle (e.g. from the perception system 31 of the vehicle), where the obtained location of free-space areas comprises an uncertainty estimation for the estimated location of free-space areas. In FIG. 2, this is indicated as "world view+ uncertainties", in the ADS module 30. As mentioned in the foregoing, free-space areas may in the present context be understood as areas in the surrounding environment of the ego-vehicle absent of objects (e.g. other vehicles, pedestrians, barriers, animals, bicycles, static objects, etc.). Thus, the obtained location of free-space areas may comprise a determined location of external objects (static and dynamic objects), determined trajectories of dynamic objects, as well as an estimate of the uncertainty of the determinations, i.e. the likelihood of the determined location of the free-space area actually being true.

Then, a risk map is generated or formed by the risk map compiling module 24 based on the obtained actuation capability and the obtained location of free-space areas. The risk map comprises a risk parameter for each of a plurality of area segments comprised in the surrounding environment of the vehicle. The risk map may be understood as a virtual map of the surrounding environment of the vehicle with a number of defined area segments, each being associated with a corresponding risk parameter.

Further, a total risk value of the ADS is determined based on the risk parameters of a set of area segments intersected by one or more planned paths of the ADS. In more detail, the path-risk evaluation module 23 provides an estimate of the risk value of a current time step/sample, and sends it a total risk calculation module 22 that is configured to calculate the total risk value of the ADS.

In some embodiments, for each time instance, the total risk of the planned path is estimated by adding together the risk of the area segments that the planned path intersects. In some embodiments, this is simplified through the use of a grid, as depicted in FIG. 6. Accordingly, one can then just add the risk parameter for each of the "boxes" (area segments) that the path passes through to get an estimate of the risk of the path. However, in some embodiments, the process of calculating the total risk may be slightly more elaborate to also account for the time evolution across both the map and the planned paths, as discussed below.

Accordingly, the total risk of a drive may be obtained by adding the risk for each planned and executed individual path and normalizing with the time driven. Alternatively, the aggregated risk of the planned paths may be normalized by the number of planned paths if equidistant time steps are used throughout the drive. The total risk may thus be schematically be described as:

$$\text{Total Risk} = \frac{1}{T} \sum_i \int_{path_i} riskmap(x) \, dx \qquad (1)$$

where T is the total time driven during the considered drive (so far) and the integral is used to account for a more precise calculation of the risk of each planned path as opposed to merely summing the risk parameters of the intersected grid-boxes as mentioned in the example above. Moreover, by accounting for the number of samples included in the risk calculation itself the system can provide a continuous estimate of the total risk that the system has been exposed to (e.g. per time-unit). This feedback loop is indicated at the output of the total risk calculation module 22 in FIG. 2.

Thus, in some embodiments, the control circuitry of the control system 10 is configured to determine the total risk value by, for each time sample:

Determining a current risk value of the ADS 30 based on the set of area segments intersected by a currently planned path since a preceding time sample.

Determining a current compounded risk value by summing the determined current risk value with a previously computed compounded risk value for the preceding time sample. The previously compounded risk value may accordingly be understood as an aggregation of the risk parameters of the area segments that were intersected by already executed paths.

Determining the total risk value by dividing the current compounded risk value with a total number of samples used up until and including a current time sample.

Thus, the total risk is compiled according to the flow shown in FIG. 2 where the total risk as well as the number of samples used from the previous calculation are fed back to be used in the next iteration to achieve the total risk.

In other words, for each time sample (after a path for execution has been selected) one calculates the risk (i.e. current risk value) of this time instance by aggregating the risk parameters of the area segments intersected by this planned path according to the risk map at this time instance. Then, this "current risk value" is summed with previously calculated risk values of each path that was executed in order to obtain the "current compounded risk value". It should be noted that those previously calculated risk values were determined according to the risk map at those time samples. The total risk value is then computed by dividing the "current compounded risk value" with the total number of samples used up until and including the current time sample.

However, even though it may be implicit, since it is the total risk that is fed back to the total risk calculation module 22, there is an additional step of multiplying the previously calculated total risk with the number of samples used to calculate that total risk, before a new "current risk value" is added to that number. This is more formally presented in the equations (2) and (3) below.

$$TR_t = \frac{CR_t}{T_t} \qquad (2)$$

$$TR_{t+1} = \frac{(TR_t \cdot T_t + PR_{t+1})}{T_{t+1}} \qquad (3)$$

Here, $TR_t$ represents the total risk value at time instance t, $CR_t$ represents the current compounded risk value, i.e. the aggregated sum of risk parameters that the ADS "has been exposed to" up until and including time instance t, and $T_t$ represents the total number of samples used to calculate the current compounded risk value up until and including time instance t. Equation (3) describes the previously mentioned process where the total risk for the previous time instance (i.e. the fed back total risk) is multiplied with the number of samples used to compute that total risk before it is added to the "current risk value" ($PR_{t+1}$). $PR_{t+1}$ represents the risk value of the planned path at time instance t+1.

Accordingly, as a vehicle maneuvers through the formed risk map one may obtain a periodically/continuously updated and quantitative estimate of the risk that the vehicle has been exposed to during those maneuvers. By having the total risk estimated continuously/periodically throughout a drive it is further possible to judge whether the ADS 30 is violating any of the safety requirements. This is particularly advantageous for an ADS of level 4 or higher (according to SAE J3016 levels of driving automation) since it must accommodate for the need of (unexpected) "high-risk" paths to be executed since it is the responsibility of the ADS to drive the vehicle in all instances when/where the ADS is active. However, if the risk level is continuously elevated above an acceptable level this should be acknowledged and appropriate actions should be taken, such as asking for a driver take-back or abort the trip to avoid incidents.

Therefore, in some embodiments, the control system further comprises a risk value assessment module 25, where the current risk value and the total risk value are compared with a first risk threshold 26 and a second risk threshold 27, respectively. More specifically, if the current risk value exceeds the first risk threshold, the control circuitry may be configured to perform at least one first action.

The one or more first actions may be one or more of generating a hand-over request to an occupant/driver of the vehicle, initiating a minimum risk condition (MRC) maneuver, or generating an alert indicative of the exceeded first risk threshold at a Human-Machine Interface (HMI) of the vehicle. In more practical terms, if the first risk threshold 26 is exceeded, that may indicate that the planned path of the ADS is associated with an elevated risk. Accordingly, the system may also incorporate a counter indicative of a number of instances that the first risk threshold 26 has been exceeded, and if the counter reaches a counter threshold, the control circuitry may be configured to perform at least one third action (generating a hand-over request to an occupant/driver of the vehicle, inhibiting future activation of the ADS at least temporarily, or generating an alert indicative of the exceeded second risk threshold at a Human-Machine Interface (HMI) of the vehicle).

Similarly, in some embodiments, if the total risk value exceeds the second risk threshold 27, the control circuitry is configured to perform at least one second action. The at least one second action may be one or more of generating a hand-over request to an occupant/driver of the vehicle, initiating a minimum risk condition (MRC) maneuver, inhibiting future activation of the ADS at least temporarily, or generating an alert indicative of the exceeded second risk threshold at a Human-Machine Interface (HMI) of the vehicle.

Figure 3:
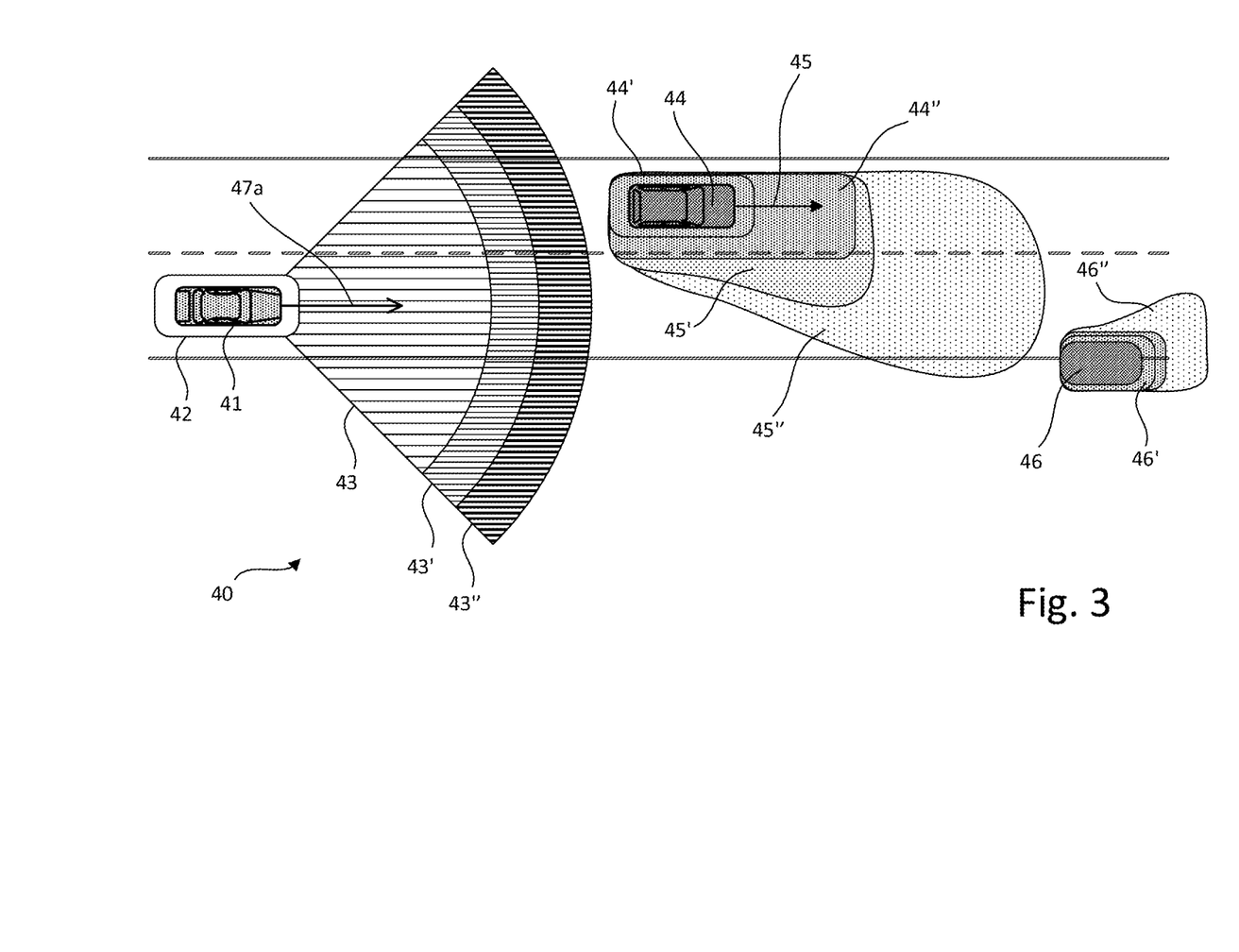
FIG. 3 is a schematic top view illustration of a risk map with some of the different components contributing to the risk map in accordance with an embodiment of the present invention.

FIG. 3 is a schematic top view illustration of a risk map 40 with some example components 41-46" contributing to the risk map 40 in accordance with an embodiment of the present invention. Furthermore, the planned path for execution 47*a-c* of the ego-vehicle is indicated in the map 40.

In more detail, the risk map 40 comprises information indicative of an estimated braking capacity of the vehicle 43 including uncertainty estimation 43', 43" of the same. Further, the risk map 40 comprises a geographical position 41 of the ego-vehicle in the map, the uncertainty estimation 42 of the geographical position 41, a position of external objects 44, 46, uncertainties of the position of the external objects 44', 44", 46', trajectories 45 of dynamic objects 44 and uncertainties 45' 45" of the trajectories 45. The estimated uncertainties may for example be computed based on models (predefined or self-learning/Machine-learning) defining a tolerance or error-margin in the measurements provided from the sensors of the vehicle (e.g. cameras, radar, LiDAR, ultrasonic sensors, etc.). Thereby, the formed risk map 40 also accounts for uncertainties inherent in such measurements of the ego-vehicle's worldview caused by for example, sensor manufacturing tolerances, noise, and so forth. Accordingly, the whole risk estimation is rendered more accurate and reliable, more accurately reflecting the actual risk exposure of the ADS of the vehicle.

Figure 4:
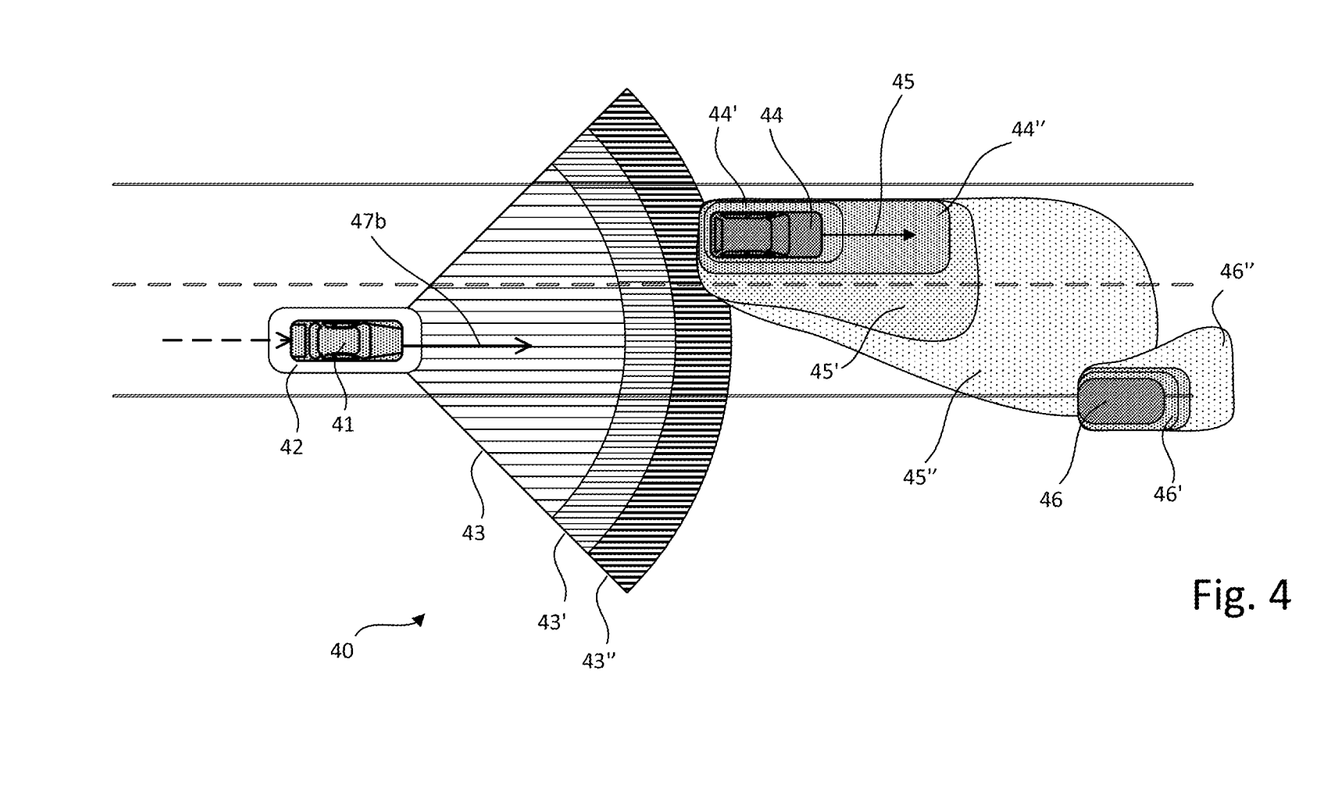
FIG. 4 is a schematic top view illustration of a risk map from FIG. 3 at a subsequent time step.
Figure 5:
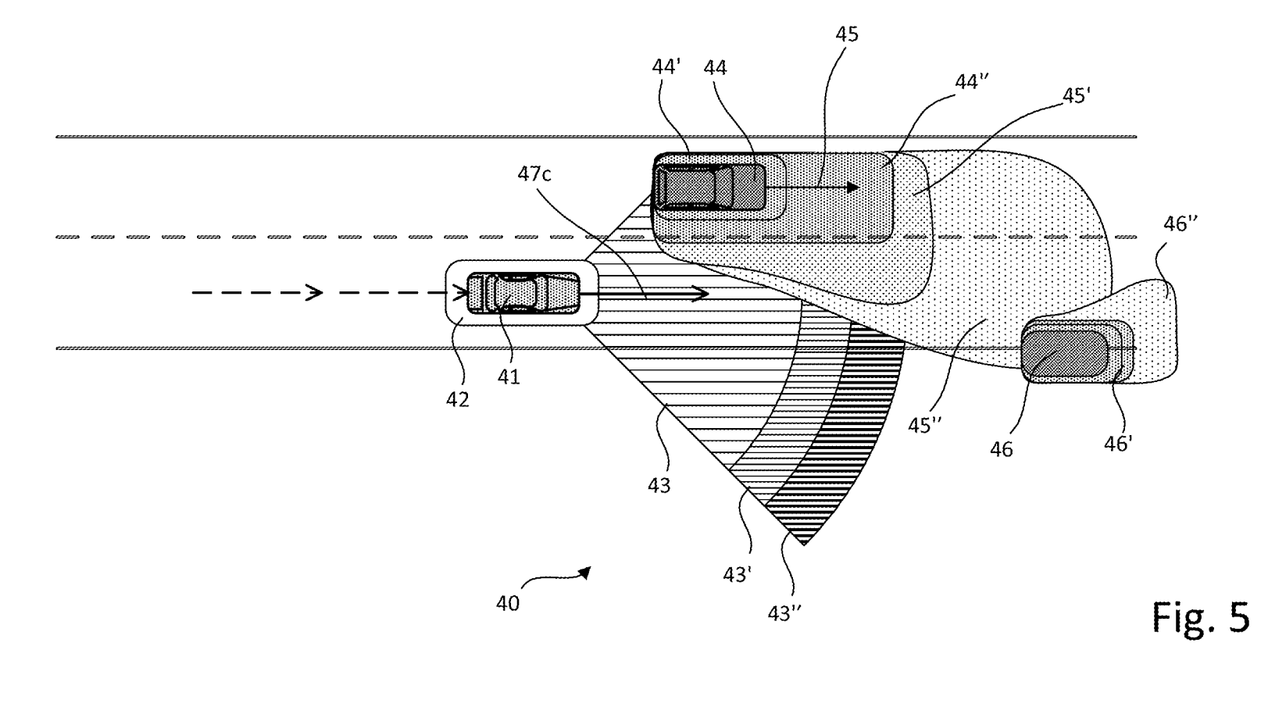
FIG. 5 is a schematic top view illustration of a risk map from FIG. 4 at a subsequent time step.

FIGS. 4-5 serve to illustrate how the risk map evolves over time for two subsequent and consecutive time instants/samples.

FIG. 6 is a schematic top view illustration of a risk map from FIG. 5 with area segments 51 indicated in the form of a grid 50 in accordance with an embodiment of the present invention. As described in the foregoing, in order to determine the total risk of the path planned for execution 47, one may add together the risk values associated with the area segments that the planned path 47 intersects 52.

Thus, reverting back to the series of FIGS. 3-5, the following serves as an example of how the total risk value may be determined, and of how the risk value changes over time in accordance with an embodiment of the present invention. FIG. 3 represents the risk map 40 at a first time instance t. Accordingly, in order to compute the total risk, the control system of the vehicle is configured to calculate a current risk value of the ADS based on the set of area segments intersected by the currently planned path 47*a*. In the present example, the current risk value of the ADS is assumed to be $10^{-8}$ based on the set of area segments intersected by the currently planned path 47*a*. As there is no previously computed total risk value or compounded risk value, the current risk value forms the total risk value at time t.

Moving on to FIG. 4, which represents the risk map 40 at a second, subsequent time instance, t+1. Here, a new path 47*b* has been planned and selected for execution. Analogously, a current risk value of the ADS is determined based on the set of area segments intersected by the currently planned path 47*b*. At this time instance, the current risk value is assumed to be $10^{-7}$. Accordingly, a current compounded risk value is determined by summing the current risk value with a previously computed compounded risk value for the preceding time sample, whereby the total risk value at time t+1 is determined by dividing the current compounded risk value with a total number of samples used up until and including a current time sample. Thus, the total risk value at time t+1 is given by equation (4) below.

$$TR_{t+1} = \frac{10^{-8} + 10^{-7}}{2} = 5,5 \cdot 10^{-8} \quad (4)$$

Further, FIG. 5 represents the risk map 40 at a third, subsequent time instance t+2. Going along with the same procedure as above, assuming a current risk value of $10^{-7}$ and utilizing equation (3) the total risk value at time t+2 is given by equation (5) below.

$$TR_{t+2} = \frac{(5,5 \cdot 10^{-8}) \cdot 2 + 10^{-7}}{3} = 7 \cdot 10^{-8}$$

Accordingly, as exemplified in the foregoing, by means of the herein proposed invention, one can obtain a more or less continuous estimate of the risk exposure of the ADS throughout a drive, and moreover how the risk exposure evolves over time. As mentioned in the foregoing, this approach provides a continuous measure between no risk and crash as opposed to other existing methods to evaluate the performance of automated/autonomous vehicles. The estimate of the total risk, as presented herein, results in a fine-grained measure of the risk of the ADS has been exposed to. Rather than just being able to add the number of hours without an incident, it is possible to compare individual hours driven.

Figure 7:
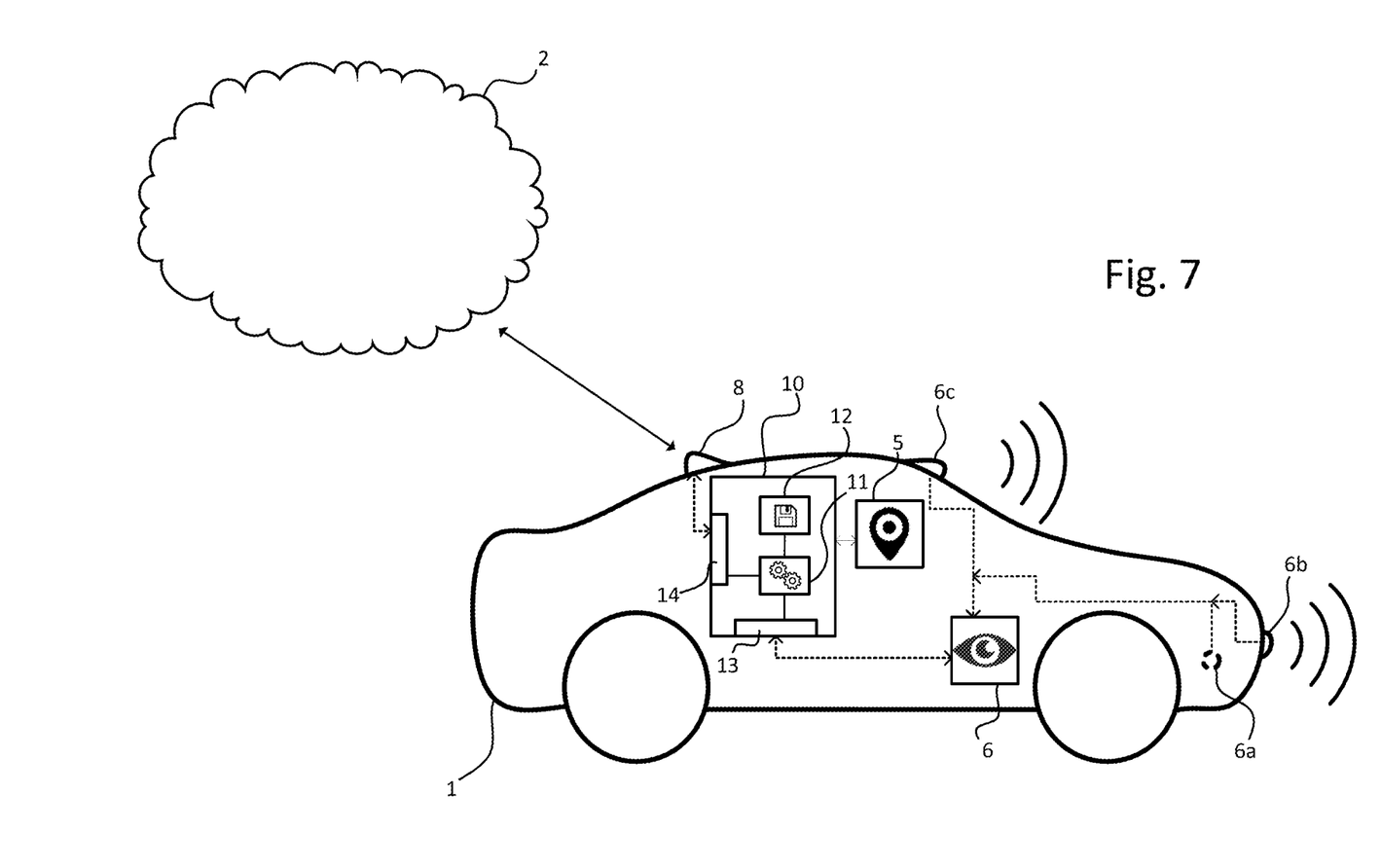
FIG. 7 is a schematic side view of a vehicle comprising a control system for estimating a risk exposure of an ADS in accordance with an embodiment of the present invention.

FIG. 7 depicts a schematic side view of a vehicle 1 comprising a control system 10 for estimating a risk exposure of an ADS in accordance with an embodiment of the present invention. The vehicle 1 further comprises an ADS, a perception system 6, and a localization system 5. A perception system 6 is in the present context to be understood as a system responsible for acquiring raw sensor data from on-board sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

In more detail, the perception system 6 may refer to any commonly known system and/or functionality, e.g. comprised in one or more electronic control modules and/or nodes of the vehicle 1, adapted and/or configured to interpret sensory information—relevant for driving of the vehicle 1—to identify e.g. obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6a-c comprised in and/or provided on-board the vehicle 1. The surrounding detecting sensors 6a-c may be represented by any arbitrary sensors adapted to sense and/or perceive the vehicle's 1 surroundings and/or whereabouts, and may e.g. refer to one or a combination of one or more of radar, LIDAR, sonar, camera, navigation system e.g. GPS, odometer and/or inertial measurement units.

The system 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for estimating a risk exposure of an ADS of the vehicle 1 according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The control system 10 is further provided with a communication interface 14 and a sensor interface 13.

The control circuitry 11 is configured to obtain an actuation capability of the vehicle based on sensor data, where the obtained actuation capability includes an uncertainty estimation for the actuation capability. Furthermore, the control circuitry 11 is configured to obtain a location of free-space areas in the surrounding environment of the vehicle based on sensor data. The obtained location of free-space areas comprises an uncertainty estimation for the estimated location of free-space areas. The control circuitry 11 is further configured to form a risk map of the surrounding environment of the vehicle 1 based on the obtained actuation capability and the obtained location of free-space areas. The risk map accordingly comprises a risk parameter for each of a plurality of area segments comprised in the surrounding environment of the vehicle. Then, by means of the formed risk map, the control circuitry 11 is configured to determine a total risk value of the ADS based on the risk parameters of a set of area segments intersected by at least one planned path of the ADS.

Further, the vehicle 1 may be connected to external network(s) 2 via for instance a wireless link (e.g. for retrieving HD map data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 may be or include any number of hardware components for conducting data or signal processing or for executing computer code stored in memory 12. The control system 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to compile or render the risk map. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

It will also be understood that, although the term first, second, etc. may be used herein to describe various elements, these elements should not be limited by these terms. These terms are only used to distinguish one element from another. For example, a first action could be termed a second action, and, similarly, a second action could be termed a first action, without departing from the scope of the embodiments.

Although the figures may show a specific order of method steps, the order of the steps may differ from what is depicted. In addition, two or more steps may be performed concurrently or with partial concurrence. For example, the steps of obtaining the actuation capability and the location of free-space areas may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

What is claimed is:

1. A method for estimating a risk exposure of an automated driving system, ADS, of a vehicle, the method comprising:
    obtaining an actuation capability of the vehicle, wherein the obtained actuation capability includes an uncertainty estimation for the actuation capability;
    obtaining a location of free-space areas in the surrounding environment of the vehicle, wherein the obtained location of free-space areas comprises an uncertainty estimation for the estimated location of free-space areas;
    forming a risk map of the surrounding environment of the vehicle based on the obtained actuation capability and the obtained location of free-space areas, wherein the risk map comprises a risk parameter for each of a plurality of area segments comprised in the surrounding environment of the vehicle; and
    determining a total risk value of the ADS based on the risk parameters of a set of area segments intersected by an executed path of the ADS, wherein the step of determining the total risk value comprises:

for each time sample:
determining a current risk value of the ADS based on the set of area segments intersected by a most recently executed path since a preceding time sample;
determining a current compounded risk value by summing the current risk value with a previously computed compounded risk value for the preceding time sample; and
determining the total risk value by dividing the current compounded risk value with a total number of samples used up until and including a current time sample.

2. The method according to claim 1, further comprising:
obtaining map data comprising HD map information of the surrounding environment and a geographical position of the vehicle, the geographical position including an uncertainty estimation of the geographical position of the vehicle,
wherein the risk map is further formed based on the obtained map data.

3. The method according to claim 1, wherein the location of free-space areas comprises:
a position of external objects located in the surrounding environment of the vehicle, and wherein the position of the external objects includes uncertainties of the position of the external objects, trajectories of any dynamic objects of the external objects and uncertainties of the trajectories of the dynamic objects.

4. The method according to claim 1, wherein the ADS is associated with a statistical model indicative of a statistical distribution related to a plurality of scenarios in the surrounding environment of the vehicle, the method further comprising:
obtaining a probability of at least one scenario occurring in the surrounding environment of the vehicle, and
wherein the risk map is further formed based on the obtained probability of the at least one scenario occurring in the surrounding environment of the vehicle.

5. The method according to claim 1, wherein the step of determining the total risk value comprises:
aggregating the risk parameters of the set of area segments intersected by the executed path; and
determining the total risk value based on the aggregated risk parameters and a total number of samples used to generate the aggregated risk parameters.

6. The method according to claim 1, further comprising:
comparing the current risk value with a first risk threshold; and
if the current risk value exceeds the first risk threshold, performing at least one first action.

7. The method according to claim 6, wherein the at least one first action comprises at least one of:
generating a hand-over request to an occupant of the vehicle;
initiating a minimum risk condition, MRC, maneuver; and
at an electronic device with a display:
displaying on the display a user interface comprising:
a graphical representation indicative of the exceeded first risk threshold.

8. The method according to claim 1, further comprising:
comparing the total risk value with a second risk threshold; and
if the total risk value exceeds the second risk threshold, performing at least one second action.

9. The method according to claim 8, wherein the at least one second action comprises at least one of:
generating a hand-over request to an occupant of the vehicle;
de-activating the ADS feature;
inhibiting future activation of the ADS feature at least temporarily; and
at an electronic device with a display:
displaying on the display a user interface comprising:
a graphical representation indicative of the exceeded second risk threshold.

10. The method according to claim 1, wherein the total risk value is further determined based on a time duration of the executed path.

11. The method according to claim 1, wherein each risk parameter is indicative of at least one of a probability of an accident event if the vehicle were to occupy an associated area segment and a probability of violating a predefined safety threshold.

12. A non-transitory computer-readable storage medium storing one or more instructions configured to be executed by one or more processors of an in-vehicle processing system, the one or more instructions for performing the method according to claim 1.

13. A control system for estimating a risk exposure of an automated driving system, ADS, of a vehicle, the control system comprising:
control circuitry configured to:
obtain an actuation capability of the vehicle, wherein the obtained actuation capability includes an uncertainty estimation for the actuation capability;
obtain a location of free-space areas in the surrounding environment of the vehicle, wherein the obtained location of free-space areas comprises an uncertainty estimation for the estimated location of free-space areas;
form a risk map of the surrounding environment of the vehicle based on the obtained actuation capability and the obtained location of free-space areas, wherein the risk map comprises a risk parameter for each of a plurality of area segments comprised in the surrounding environment of the vehicle; and
determine a total risk value of the ADS based on the risk parameters of a set of area segments intersected by an executed path of the ADS,
wherein in determining the total risk value, the control circuitry is further configured to:
for each time sample:
determine a current risk value of the ADS based on the set of area segments intersected by a most recently executed path since a preceding time sample;
determine a current compounded risk value by summing the current risk value with a previously computed compounded risk value for the preceding time sample; and
determine the total risk value by dividing the current compounded risk value with a total number of samples used up until and including a current time sample.

14. A vehicle comprising:
an Automated Driving System, ADS;
a perception system comprising at least one sensor configured to monitor a surrounding environment of the vehicle;
a vehicle control system comprising at least one sensor configured to monitor an actuation capability of the vehicle;
a localization system configured to monitor a geographical map position of the vehicle;

a control system for estimating a risk exposure of an automated driving system, ADS, of a vehicle, the control system comprising:
control circuitry configured to:
obtain an actuation capability of the vehicle, wherein the obtained actuation capability includes an uncertainty estimation for the actuation capability;
obtain a location of free-space areas in the surrounding environment of the vehicle, wherein the obtained location of free-space areas comprises an uncertainty estimation for the estimated location of free-space areas;
form a risk map of the surrounding environment of the vehicle based on the obtained actuation capability and the obtained location of free-space areas, wherein the risk map comprises a risk parameter for each of a plurality of area segments comprised in the surrounding environment of the vehicle; and
determine a total risk value of the ADS based on the risk parameters of a set of area segments intersected by an executed path of the ADS,
wherein in determining the total risk value, the control circuitry is further configured to:
for each time sample:
determine a current risk value of the ADS based on the set of area segments intersected by a most recently executed path since a preceding time sample;
determine a current compounded risk value by summing the current risk value with a previously computed compounded risk value for the preceding time sample; and
determine the total risk value by dividing the current compounded risk value with a total number of samples used up until and including a current time sample.

* * * * *